US009928254B1

(12) United States Patent
Paulson

(10) Patent No.: US 9,928,254 B1
(45) Date of Patent: Mar. 27, 2018

(54) AUTOMATIC IMAGE DISPLAY SYSTEMS AND METHODS WITH LOOPED AUTOSCROLLING AND STATIC VIEWING MODES

(71) Applicant: Picadipity, Inc., Seattle, WA (US)

(72) Inventor: Kevin Paulson, Seattle, WA (US)

( * ) Notice: Subject to any disclaimer, the term of this patent is extended or adjusted under 35 U.S.C. 154(b) by 0 days.

(21) Appl. No.: 15/703,881

(22) Filed: Sep. 13, 2017

Related U.S. Application Data

(60) Provisional application No. 62/395,215, filed on Sep. 15, 2016.

(51) Int. Cl.
*G06F 17/30* (2006.01)
*G06T 1/20* (2006.01)
*G06F 3/0485* (2013.01)
*G06F 3/01* (2006.01)
*G06K 9/00* (2006.01)

(52) U.S. Cl.
CPC ...... *G06F 17/30277* (2013.01); *G06F 3/0485* (2013.01); *G06T 1/20* (2013.01); *G06F 3/017* (2013.01); *G06K 9/00335* (2013.01); *G06K 9/00355* (2013.01)

(58) Field of Classification Search
CPC .... G06F 3/017; G06F 3/0482; G06F 3/04845; G06F 3/0485; G06F 3/04847; G06F 17/30277; H04N 1/00442; H04N 1/00458; G06K 9/00335; G06K 9/00355; G06T 1/20
See application file for complete search history.

(56) References Cited

U.S. PATENT DOCUMENTS

| | | | |
|---|---|---|---|
| 8,396,921 B2 | 3/2013 | McCormack et al. | |
| 8,429,521 B2 | 4/2013 | Lloyd et al. | |
| 8,429,557 B2 | 4/2013 | Platzer et al. | |
| 8,595,645 B2 | 11/2013 | Boettcher | |
| 8,601,389 B2 | 12/2013 | Schulz | |
| 8,661,363 B2 | 2/2014 | Platzer | |
| 8,737,821 B2 | 5/2014 | Li | |
| 8,767,014 B2 | 7/2014 | Vaught | |
| 8,910,073 B2 | 12/2014 | Mercer | |
| 8,949,735 B2 | 2/2015 | Ramachandran | |
| 9,009,620 B2 | 4/2015 | Lefor et al. | |
| 9,009,626 B2 | 4/2015 | Tsuk et al. | |
| 9,021,386 B1 | 4/2015 | Rasmussen et al. | |
| 9,037,995 B2 | 5/2015 | Platzer et al. | |
| 9,311,718 B2 | 4/2016 | Scavezze et al. | |
| 9,354,803 B2 | 5/2016 | Ording et al. | |
| 9,395,811 B2 | 7/2016 | Vaught et al. | |
| 9,400,598 B2 | 7/2016 | Pixley et al. | |
| 9,417,779 B2 | 8/2016 | Flake et al. | |
| 2011/0074824 A1* | 3/2011 | Srinivasan | G06F 3/04883 345/660 |
| 2015/0106722 A1* | 4/2015 | Ubillos | G06F 3/0488 715/731 |
| 2016/0124514 A1* | 5/2016 | Cha | G06F 3/017 715/767 |

* cited by examiner

*Primary Examiner* — Kenny Cese
(74) *Attorney, Agent, or Firm* — Aeon Law, PLLC; Adam L. K. Philipp; Jonathan E. Olson

(57) ABSTRACT

Methods and systems are presented for automatic image display systems and methods with looped autoscrolling or step scrolling modes (or both). Data configurations are also presented that allow an efficient arrangement of palettes that boosts autoscrolling performance and improves the users' experience without the need for major hardware enhancements.

16 Claims, 12 Drawing Sheets

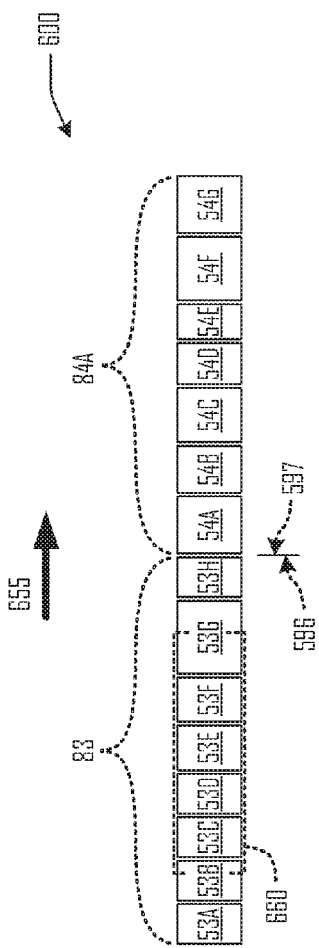
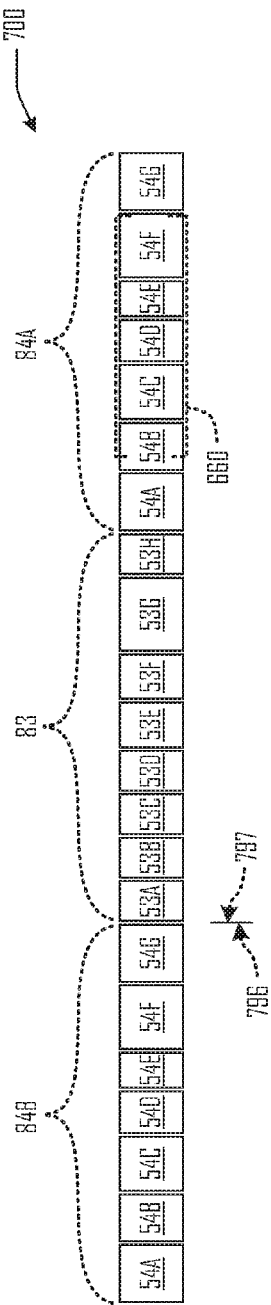

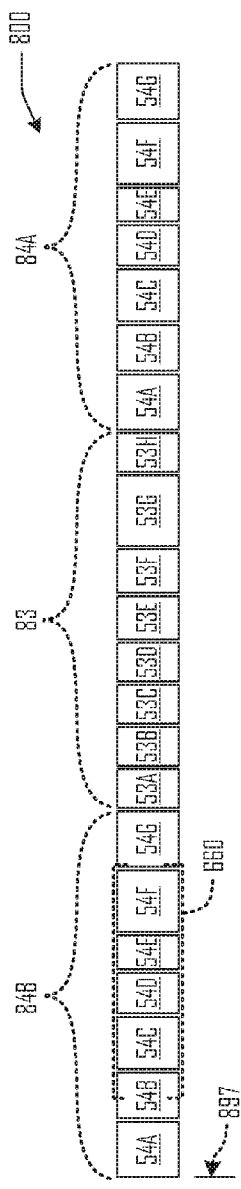
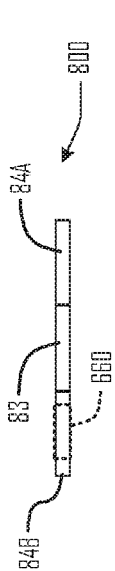
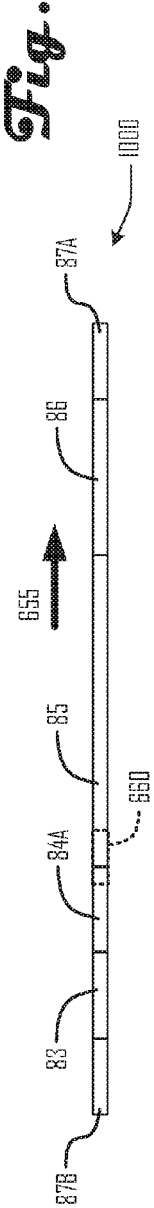

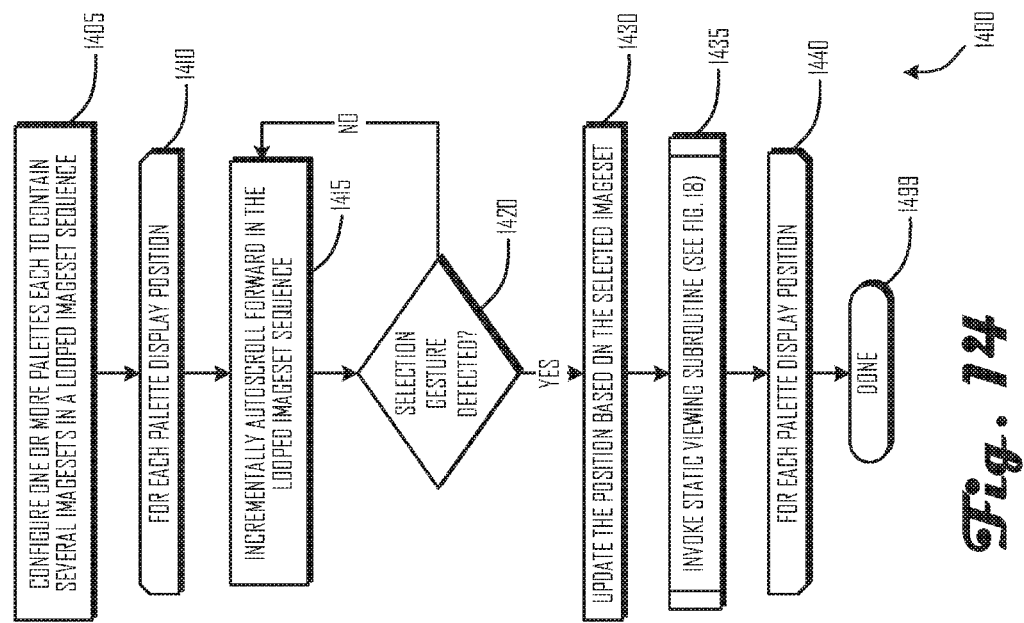
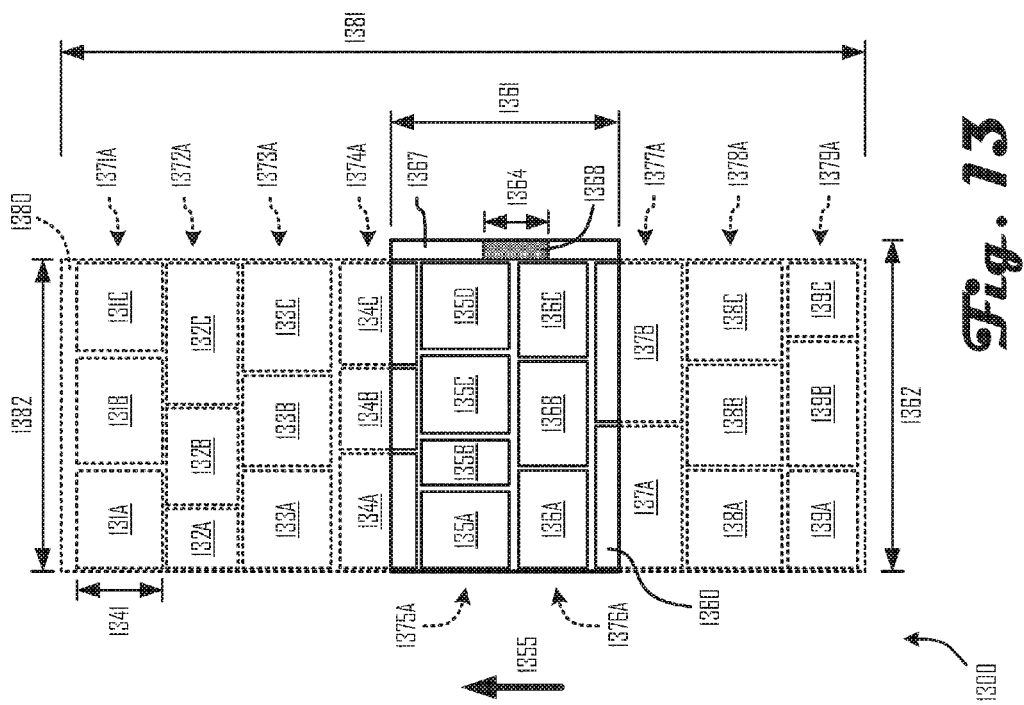
Fig. 14
Fig. 13

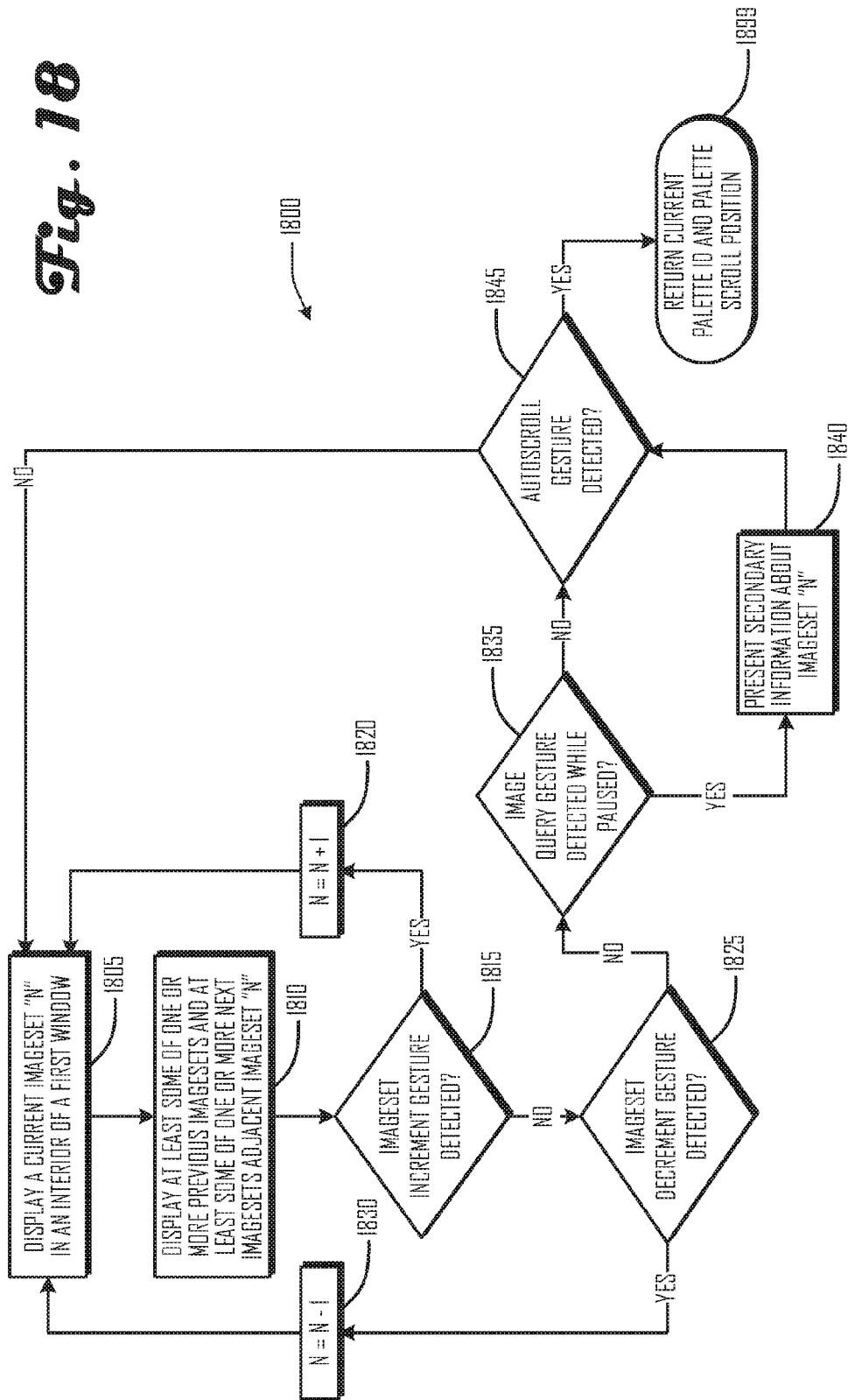

AUTOMATIC IMAGE DISPLAY SYSTEMS AND METHODS WITH LOOPED AUTOSCROLLING AND STATIC VIEWING MODES

RELATED APPLICATIONS

This application claims the benefit of provisional U.S. App. No. 62/395,215 ("Automatic image display systems and methods with looped autoscrolling and step scrolling modes") filed 15 Sep. 2016, which is included herein by reference.

BRIEF DESCRIPTION OF THE DRAWINGS

FIG. 6 depicts a first data schematic identifying content being presented in relation to other content horizontally offset and ready to display.

FIG. 7 depicts a second data schematic in relation to the first.

FIG. 8 depicts a third data schematic in relation to the second.

FIG. 9 depicts a less-magnified view of the third data schematic.

FIG. 10 depicts a fourth data schematic in relation to the third.

FIG. 11 depicts a fifth data schematic in relation to the fourth.

FIG. 13 depicts a sixth data schematic.

FIG. 14 depicts an interactive graphical display routine suitable for use with at least one embodiment.

FIG. 18 depicts a static presentation subroutine suitable for use with at least one embodiment.

DETAILED DESCRIPTION

Figure 1:
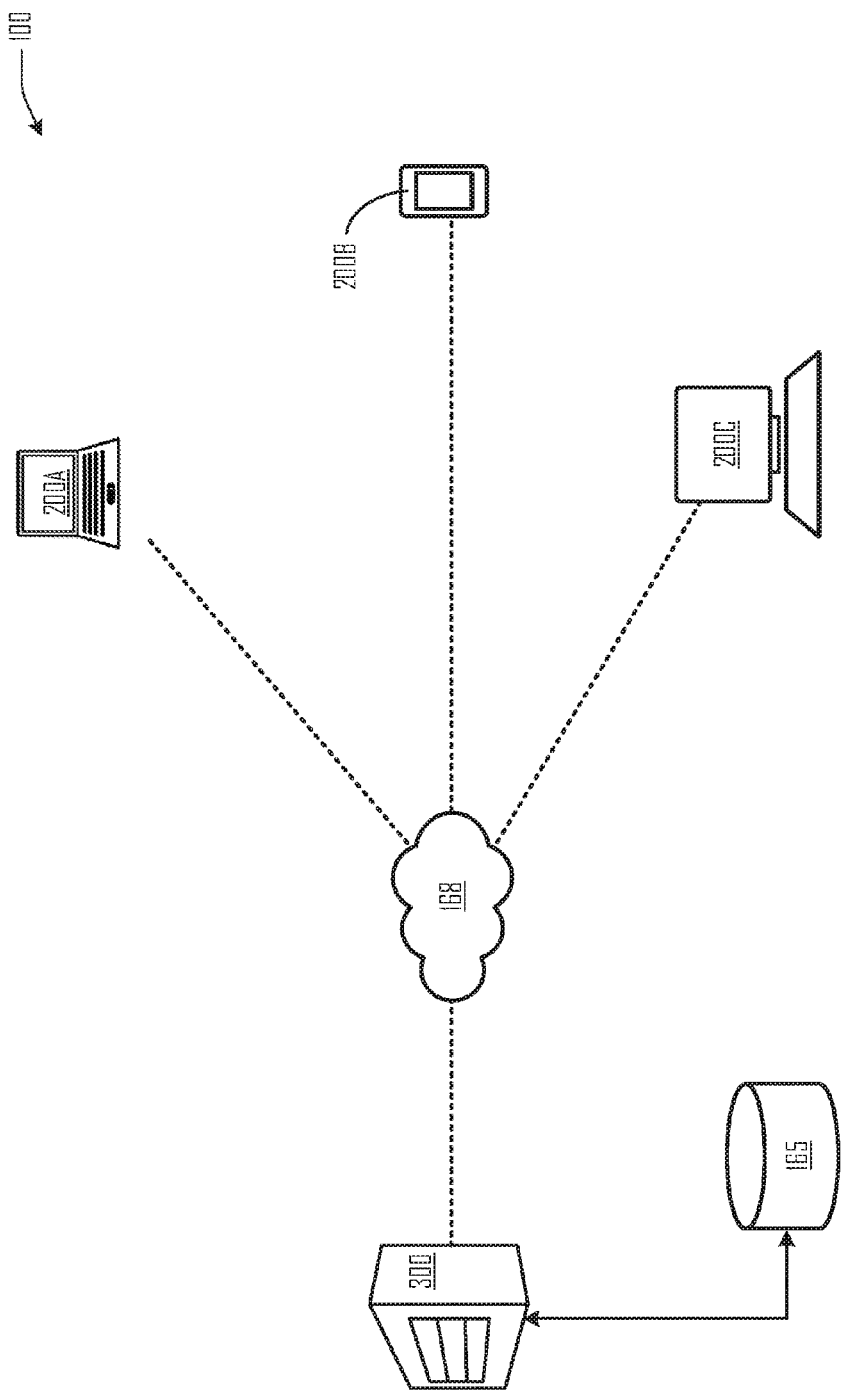
FIG. 1 depicts a system with a repository server and several client devices.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers or other repository servers, computer servers and memory storage devices.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Adjacent," "alternative," "automatic," "being," "both," "coincident," "concerning," "consecutive," "containing," "digital," "distributed," "electrical," "fully," "having," "in common," "incremental," "inner," "leading," "least," "manifesting," "mixed," "more," "outside," "partly," "received," "related," "said," "second," "simultaneous," "steadily," "toggled," "trailing," "transistor-based," "unmodified," "until," "user-perceptible," "various," "wherein," "with," or other such descriptors herein are used in their normal yes-or-no sense, not as terms of degree, unless context dictates otherwise. In light of the present disclosure those skilled in the art will understand from context what is meant by "adjacent" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 depicts an information management system 100 tailored to streamline various computer processes, especially data arrangement and presentation, to facilitate efficient high performance image management and presentation. A repository server 300 aggregates images from various client devices 200A-C (by managing one or more distributed media libraries or cloud-based data stores 165 as shown, e.g.). Upon request by one particular such client device (a "Picadipity™ device," e.g.) through network 168, image data is selectively provided and presented.

Figure 2:
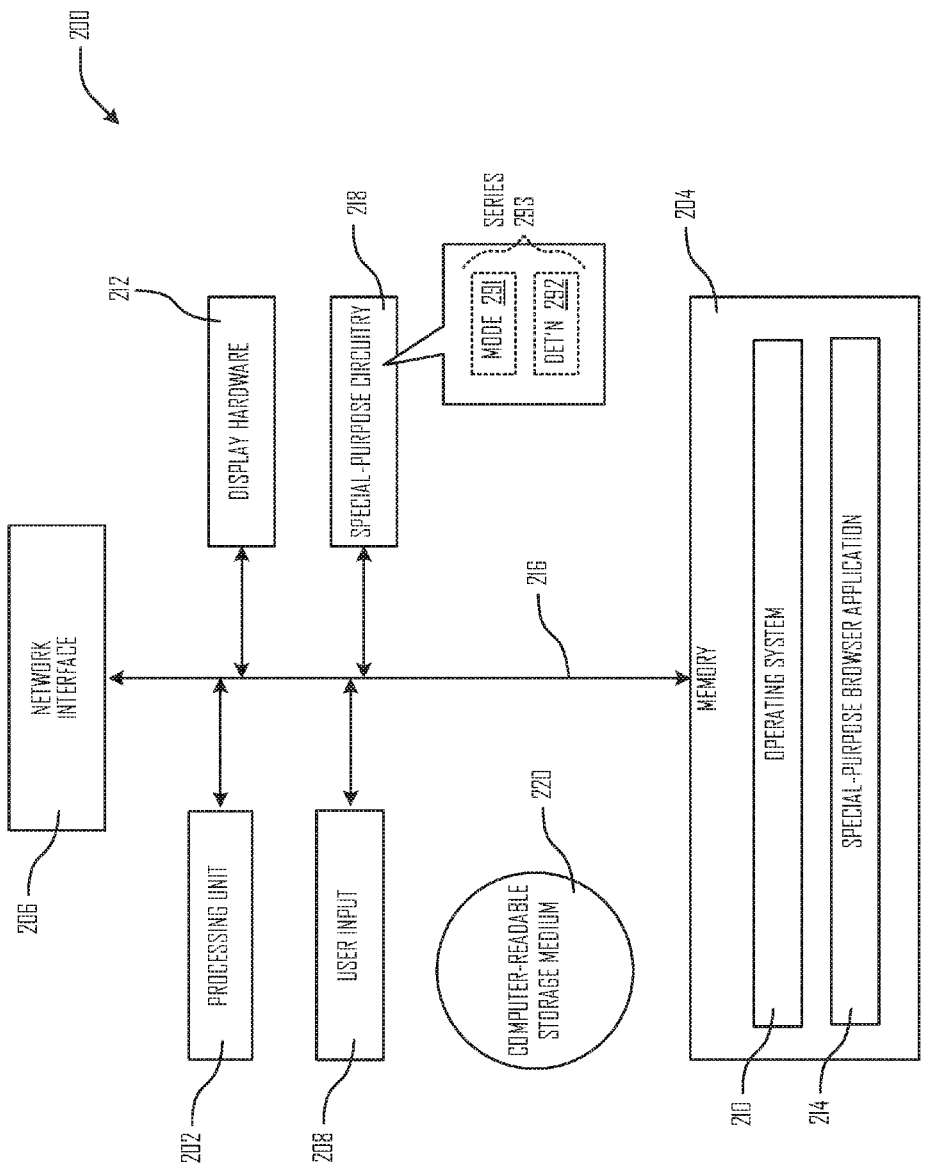
FIG. 2 depicts a client device, optionally a handheld or user-wearable article.

FIG. 2 illustrates a client device 200 in which one or more technologies may be implemented. As shown in FIG. 2, exemplary client device 200 includes one or more processing units 202 in data communication with one or more memories 204 via one or more buses 216. Each such memory 204 generally comprises some or all of random access memory (RAM), read-only memory (ROM), or a permanent mass storage device, such as a disk drive, flash memory, or the like. Client device 200 may also include one or more instances of network interfaces 206, of user inputs 208, of displays 212, or of speakers.

As shown, memory 204 of exemplary client device 200 may store an operating system 210, as well as program code for a number of software applications, such as a browser application 214 or Picadipity™ client application. Each of these is a software application by which, under client device control, client devices 200 can present data to users and transmit data from users. These and other software components, as well as various data files (not shown) may be loaded into memory 204 via network interface 206 (or via a selectively removable computer readable storage medium 220, such as a memory card or the like).

In operation, operating system 210 manages the hardware and software resources of the client device 200 and provides common services for various software applications, such as browser application 214. For hardware functions such as network communications via network interface 206, obtaining data via user input 208, rendering data via displays 212 or speakers, allocation of memory 204 to various resources, operating system 210 may act as an intermediary between software executing on client device 200 and the client device's hardware. In some contexts, for example, such hardware may include special-purpose transistor-based circuitry 218 (as described below, e.g.) that manifests one or more instances of modes 291 (of operation), of determinations 292, or of series 293 (of sequential events, e.g.) as voltage configurations.

For example, operating system 210 may cause a representation of locally available software applications, such as browser application 214, to be rendered locally (via display 212, e.g.). If operating system 210 obtains, e.g. via user input 208, a selection of browser application 214, operating system 210 may instantiate a browser application process (not shown), i.e. cause processing unit 202 to begin executing the executable instructions of browser application 214 and allocate a portion of memory 204 for its use. In some contexts, downloads may require an access control feature configured to prevent unauthorized downloads and permit specially-configured client devices to access repository server 300. Alternatively or additionally, some functions may occur "offline" in the sense that the client device 200 is temporarily disconnected from repository server 300. In descriptions of autoscroll looping or paused presentation modes 291 described below, it is contemplated that such active presentation and exploration of imagesets and palettes may, in some variants, continue to be autoscrolled and explored indefinitely even in an offline mode 291. As used herein, "presentation mode" refers to a protocol by which particular media content (images or clips, e.g.) is displayed or played via a user interface. As used herein, "autoscroll" refers to a visual presentation mode 291 in which scrolling, not static presentation, occurs by default. As used herein, "looping" refers to presenting a finite series of content arrangements (palettes, e.g.) such that a viewer's virtual movement through the finite series (scrolling, e.g.) can occur repeatedly.

Although an exemplary client device 200 has been described, a client device 200 may be a mobile device or other device capable of executing program code, such as the program code corresponding to browser application 214. Alternatively or additionally, the structures described with reference to FIG. 2 may likewise be implemented by a special-purpose peer computer in a peer-to-peer network.

Figure 3:
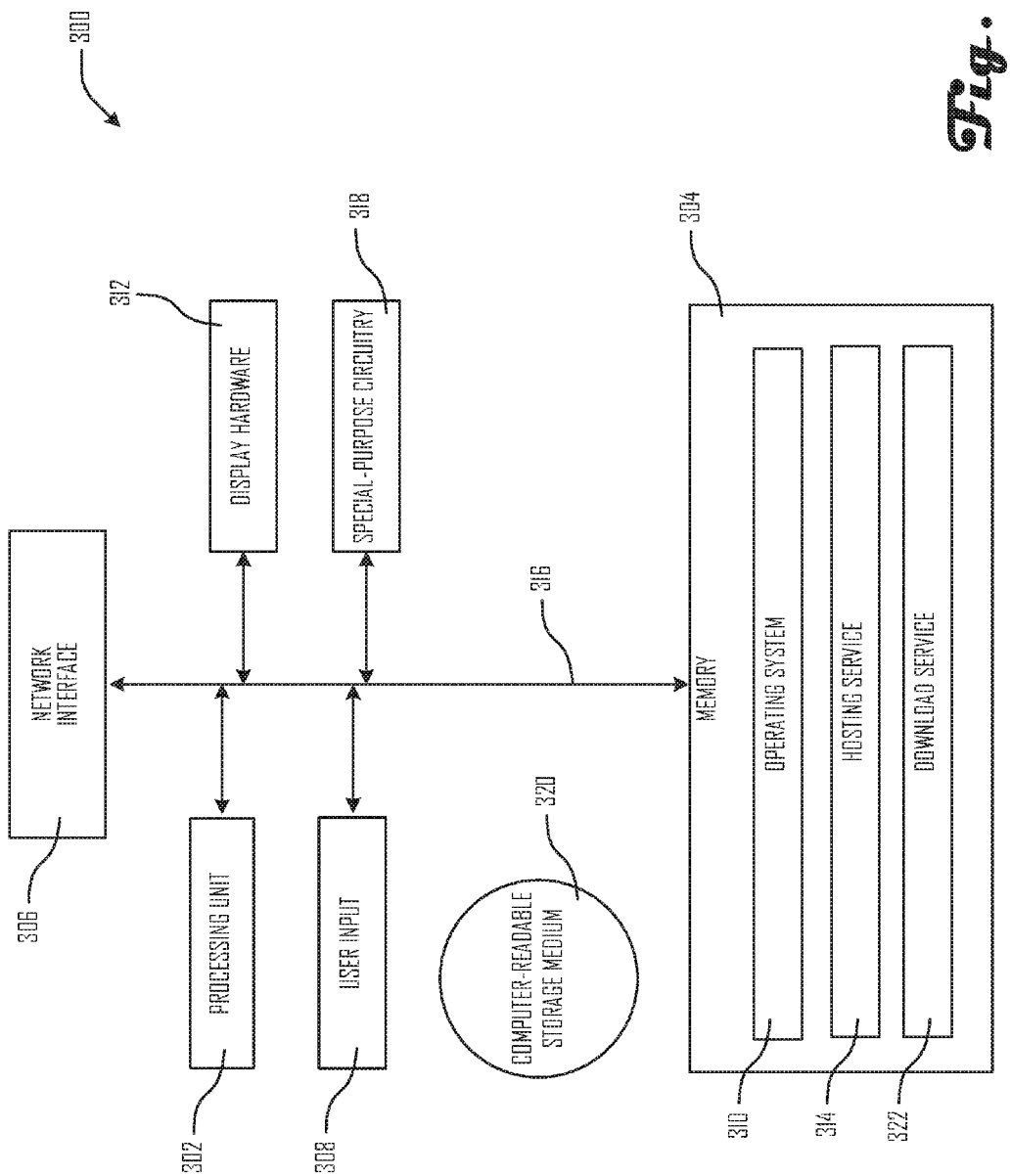
FIG. 3 depicts a repository server suitable for use with the present invention.

FIG. 3 illustrates a repository server 300 in which one or more technologies may be implemented. As shown in FIG. 3, exemplary repository server 300 includes one or more processing units 302 in data communication with one or more memories 304 via one or more buses 316. Each such memory 304 generally comprises some or all of random access memory (RAM), read-only memory (ROM), or a permanent mass storage device, such as a disk drive, flash memory, or the like. Repository server 300 may also include one or more instances of network interfaces 306, of user inputs 308, of displays 312, or of speakers.

As shown, memory 304 of exemplary repository server 300 may store an operating system 310, as well as program code for a number of software applications, such as a hosting service 314. Hosting service 314 is a software application by which client devices 200 can present data to users and transmit data from users. Alternatively or additionally, repository server 300 may be configured with a download service 322 by which a special-purpose Picadipity™ client application may be downloaded and run on client devices 200. These and other software components, as well as various data files (not shown) may be loaded into memory 304 via network interface 306 (or via a selectively removable computer readable storage medium 320, such as a memory card or the like).

In operation, operating system 310 manages the hardware and software resources of the repository server 300 and provides common services for various software applications, such as hosting service 314. For hardware functions such as network communications via network interface 306, obtaining data via user input 308, rendering data via displays 312 or speakers, allocation of memory 304 to various resources, operating system 310 may act as an intermediary between software executing on repository server 300 and the client device's hardware (including special-purpose transistor-based circuitry 318 as described below, e.g.).

For example, operating system 310 may cause a representation of locally available software applications, such as hosting service 314, to be rendered locally (via display 312, e.g.). If operating system 310 obtains, e.g. via user input 308, a selection of hosting service 314, operating system 310 may instantiate a hosting process (not shown), i.e. cause processing unit 302 to begin executing the executable instructions of hosting service 314 and allocate a portion of memory 304 for its use. In some contexts, downloads may require an access control feature configured to prevent unauthorized downloads and permit specially-configured client devices to access repository server 300. Alternatively or additionally, some functions may occur "offline" in the sense that the repository server 300 is temporarily disconnected from client device 200. In descriptions of autoscroll looping or paused presentation modes 291 described below, it is contemplated that such active presentation and exploration of imagesets and palettes may, in some variants, continue to be autoscrolled and explored indefinitely even in an offline mode 291.

Although an exemplary repository server 300 has been described, a repository server 300 may be a mobile device or other device capable of executing program code, such as the program code corresponding to hosting service 314. Alternatively or additionally, the structures described with reference to FIG. 3 may likewise be implemented by a special-purpose peer computer in a peer-to-peer network.

Figure 4:
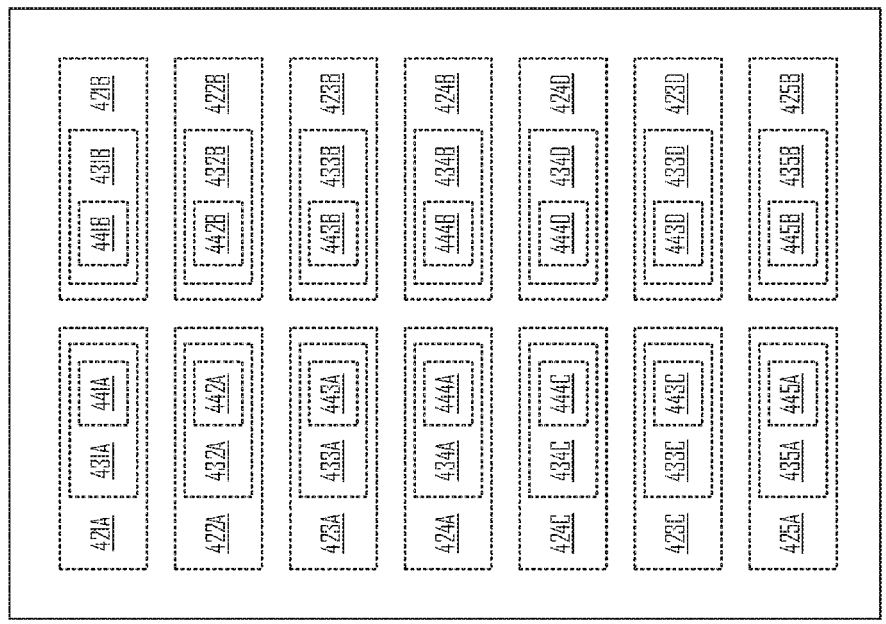
FIG. 4 depicts special-purpose transistor-based circuitry configured to implement several functional modules suitable for implementing the present invention.

FIG. 4 illustrates special-purpose transistor-based circuitry 400—optionally implemented as an Application-Specific Integrated Circuit (ASIC) or multi-core processor (in special-purpose circuitry as described above, e.g.)—in which some or all of the functional modules described below may be implemented. Transistor-based circuitry 400 is an event-sequencing structure generally as described in U.S. Pat. Pub. No. 20150094046 but configured as described herein. Transistor-based circuitry 400 includes one or more instances of detection modules 423A-D, for example, each including an electrical node set 433A-D upon which user input or other informational data is represented digitally as a corresponding voltage configuration 443A-D.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any records, status values, or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Transistor-based circuitry 400 further includes one or more instances of display modules 421A-B, for example, each including an electrical node set 431A-B (of one or more nodes) upon which a hardware type or other informational data is represented digitally as a corresponding voltage configuration 441A-B as shown. Transistor-based circuitry 400 further includes one or more instances of configuration modules 422A-B, for example, each including an electrical node set 432A-B upon which image identifiers or other informational data is represented digitally as a corresponding voltage configuration 442A-B as shown. Transistor-based circuitry 400 further includes one or more instances of control modules 424A-D, for example, each including an electrical node set 434A-D upon which operating parameters or other informational data is represented digitally as a corresponding voltage configuration 444A-D as shown. Transistor-based circuitry 400 further includes one or more instances of update modules 425A-B, for example, each including an electrical node set 435A-B upon which memory addresses or other informational data is represented digitally as a corresponding voltage configuration 445A-B as shown. In some variants, such a module implements such functionality jointly (in conjunction with other modules or processing units described herein, e.g.).

Figure 5:
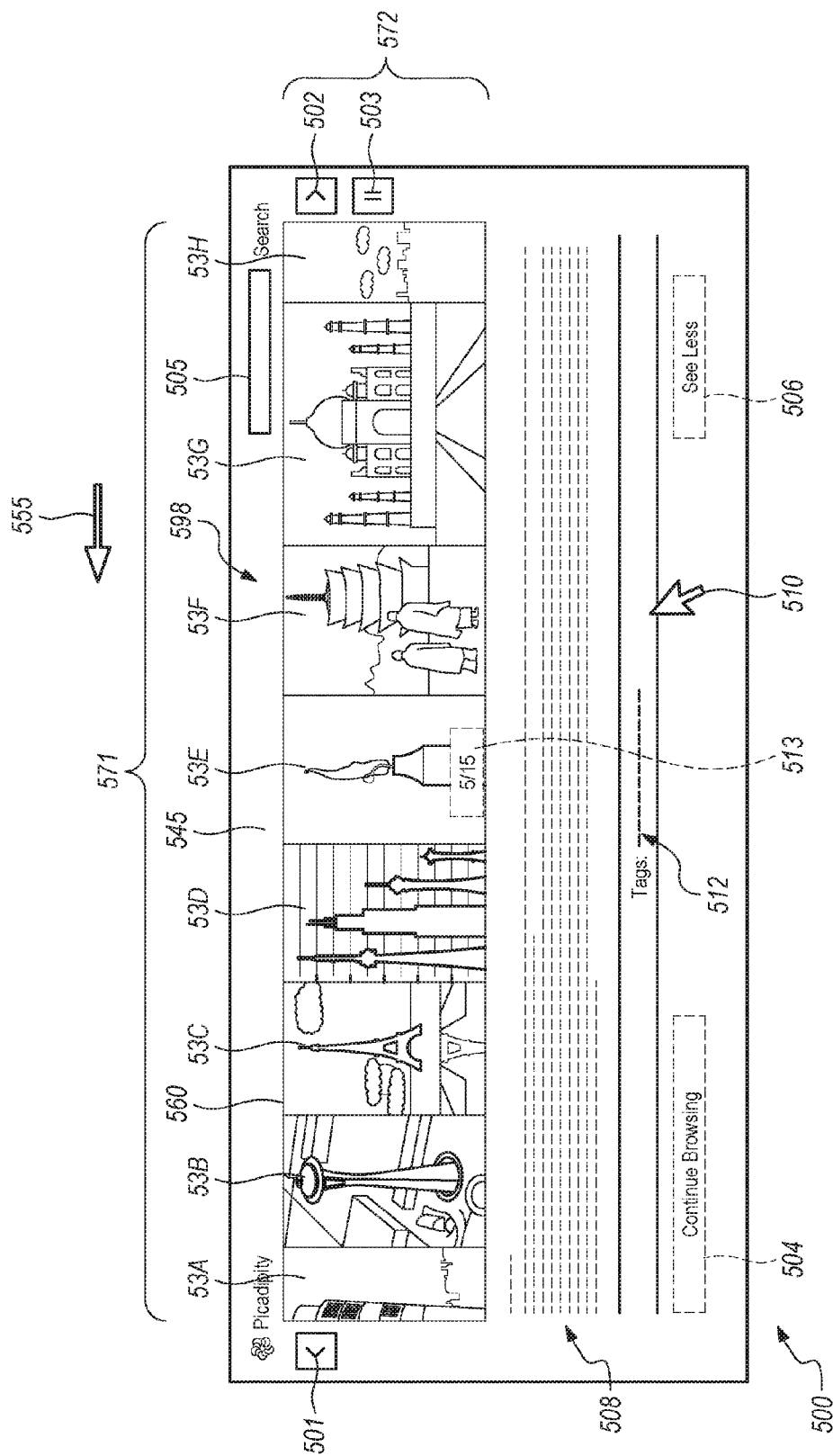
FIG. 5 depicts a screen display exemplifying how a user may perceive one or more inventive technologies.

FIG. 5 depicts a touchscreen or other hardware screen display 500 in which one or more technologies may be present. As shown, a digital display window 545 presents a portion of a series of photographic or other images 53A-H in a media player display region 560 that has a length 571 less than that of the images 53A-H (taken together) and a width 572 not less than that of the images 53A-H. As an automatic response to a process by which display window 545 was provided to screen display 500, the series of images 53A-H is scrolling smoothly through a display window 545 in direction 555 (leftward in small, generally uniform increments that are updated in display window 545 many times per second, e.g.). So long as the user permits this automatic scrolling to continue (generally in a manner similar to that of interactive graphical display routine described below with reference to FIG. 14, e.g.), this series of images continues to scroll in direction 555 until it passes out of display window 545. (The terms "length" and "width" are, in this context, defined relative to the direction 555.)

Display window 545 also presents an index 513 that includes an integer (5, e.g.) that identifies a primary image 53E near the center of display window 545 (optionally within media player display region 560, e.g.). At the same time, a plurality of tags 512 assigned to the primary image 53E (and optionally to the series of images 53A-H) are presented as each primary image passes across the center of display window 545. Alternatively or additionally, a prose description or other metadata 508 pertaining to the primary image 53E is presented at that time. In some variants, the pace of the autoscroll may be on the order of 1.5 seconds per image (i.e. within an order of magnitude). Alternatively or additionally, the pace of the autoscroll may be a user-adjustable value on the order of 200 pixels per second. In some variants, for example, the user may input a specific pace and direction of the autoscroll by touching one of the images 53A-H and flinging it left or right (clicking on an image 53F with cursor 510 and releasing it while dragging that image forward or backward rapidly, e.g.) such that a faster fling results in a faster autoscroll that is subsequently maintained until further user action is detected.

In some variants display window 545 may also include additional controls (a step-backward button 501 and a step-forward button 502, e.g.) configured to invoke and facilitate a static presentation subroutine as presented below (with reference to FIG. 18, e.g.). Alternatively or additionally, a pause/play button 503 may be provided. When first actuated, pause/play button 503 may, for example, interrupt the ordinary autoscroll procession and cause a current primary image 53E to move toward a center of display region 560. If step-backward button 501 is actuated, a next-prior image 53D becomes the primary image. If step-forward button 502 is actuated, a next-subsequent image 53F becomes the primary image. Any of these buttons 501-503 may (optionally) be used to toggle from an autoscroll mode 291 into a static presentation mode 291 and to trigger a transitional animation that takes on the order of 0.8 seconds (for the user-selected primary image to move toward a center of display region 560, e.g.). A subsequent actuation of pause/play button 503 allows a user to resume the autoscroll mode 291 from the current static longitudinal position (with the last user-selected image longitudinal centered in display region 560, e.g.). This can occur, for example, in a context in which such toggling would otherwise require a user to interact with more than one point of display window 545 so that a user's expedient review of hundreds of images would require many more steps of user gesture detection.

Alternatively or additionally, display window 545 may also include a "continue browsing" button 504 that triggers an unrelated new series of images (not having any tags 512 in common with a primary image 53E, e.g.) to replace the current series of images 53A-H. In some variants display window 545 may likewise include a search field 505 that triggers a new series of images (an image search result from a search engine based upon a search term entered into search field 505, e.g.) to replace the current series of images 53A-H (with one or more new palettes in a looped imageset sequence 598 as described below, e.g.). In some variants display window 545 may likewise include a prolixity toggle button 506 that triggers some or all of the available metadata 508 to be suppressed and that triggers the button 506 to change (from "see less" to "show more," e.g.). In some variants some or all such controls (buttons, e.g.) may be omitted from display windows 545. In some contexts, for example, client device 200 may be configured so that a touchscreen activation, voice selection, or other such selection of any image 53B (at least partly) visible within display region 560 can be achieved by detecting a gesture toward the image. This can occur, for example, in a context in which client device 200 is a wearable article; in which no cursor 510 is provided; and in which mode switching as described herein (generally as provided in FIGS. 14 and 18 below, e.g.) would not otherwise be viable.

As used herein, the term "imageset" refers to one or more images presented in proximity. Thus an "imageset" may refer herein to a single image but not to a highly dispersed or empty "set" of images. As used herein, the term "palette" refers to an oblong arrangement of several imagesets having mixed aspect ratios (i.e. within which not all of the images have a uniform aspect ratio).

FIG. 6 depicts a data schematic 600 in which one or more technologies may be present, a memory space in which a first palette 83 (being a series of eight images 53A-H described above) is adjacent an adjacent second palette 84A (being a series of seven images 54A-G arranged along the same direction 655). The smooth autoscrolling described above is implemented, according to data schematic 600, so that a trailing edge 596 of palette 83 is positioned adjacent (at or just before, e.g.) a leading edge 597 of palette 84A as both palettes advance in direction 555. The leftward direction 555 of smooth scrolling is maintained through the palette transition by frequent incremental movement of the media player display region 660 effectively moving in an opposite direction 655 (rightward, in this instance) through the memory space as depicted. This can occur, for example, in a context in which scrolling proceeds very smoothly across this inter-palette transition because of the adjacent positioning of the successive palettes 83, 84A and in which providing a new pixel image to display window 545 for each incremental scroll movement would otherwise consume excessive data handling resources and thus create undue scrolling flicker frequently perceptible to the user.

FIG. 7 depicts a variant data schematic 700 somewhat modified from the data schematic 600 of FIG. 6. The user-perceptible imageset inventory of 15 images is represented as a combination of the eight images 53A-H of palette 83 longitudinally adjacent the seven images 54A-G of palette 84A, as shown in data schematic 600. In data schematic 700, however, the display region has scrolled rightward for several seconds (relative to its earlier position shown in FIG. 6). Absent some change, however, a trailing edge of the last image 54G of the 15 images will scroll into display region 660 momentarily. In order to make the best use of the available display region 660 that will start to open up at that time, it is desirable to plan ahead and take steps as to what will be displayed there.

One space-efficient and time-efficient solution is to make another copy of a minority of the inventory of images (those in palette 84A, e.g.) in a memory space adjacent a leading edge 797 of palette 83. As shown for example, a copy of palette 84A (the copy being labeled as palette 84B) may be positioned so that its trailing edge 796 is adjacent the leading edge 797 of palette 83. Although it is not an instantaneous process to jump the effective display region 660 to the alternate palette 84B, the flicker associated with this transition will be less than most other alternatives and may, in many instances, be an attractive compromise.

FIG. 8 depicts a variant data schematic 800 modified from the data schematic 700 of FIG. 7 in that the looped imageset sequence of 15 images has advanced a few pixels further. To avoid a collision with a trailing edge 797 of palette 84A after which there is nothing meaningful to display, a jump has been implemented to a portion of palette 84B so that the trailing edge 796 of palette 84B is presented in display region 660 instead of scrolling past the trailing edge of palette 84A. If a user then reverses direction (by repeatedly decrementing as described with reference to FIG. 18, e.g.) and continues moving in a "reverse" direction, of course, it may become appropriate to jump back to palette 84A to avoid colliding with a leading edge 897 of palette 84B. Alternatively or additionally, additional instances of palettes 83,84 may be appended to one or both ends to facilitate longer periods wherein movement among the 15 images the user sees is accomplished by incremental longitudinal movement of display region 660 (in lieu of jumps, e.g.).

FIG. 9 depicts a less-magnified view of the data schematic 800 of FIG. 8. Display region 660 is shown in a leftmost one of the same arrangement of palettes 83, 84A-B, but the individual images within them are not shown explicitly.

FIG. 10 depicts a variant data schematic 1000 modified from the data schematic 800 of FIGS. 8-9 in that the looped imageset sequence thereof is now much larger (longer and having more images, e.g.) than the original 15 images. With this expanded sequence, it is now possible for display region 660 to scroll (in an autoscroll or paused mode 291, e.g.) in a forward direction 655 past the end of palette 84A and through palettes 85, 86 and into a new last palette 87A. A duplicate of one or more such last palettes is likewise positioned at the beginning of the looped palette sequence as shown so that while scrolling a flicker resulting from a jump operation (from palette 87A to 87B, e.g.) can be minimized. By a comparison of FIGS. 9 and 10, it is apparent that a lead-in palette 84B that was previously present has been overwritten by a new lead-in palette 87B during the looped imageset sequence expansion.

FIG. 11 depicts a variant data schematic 1100 modified from the data schematic 1000 of FIG. 10 in that the looped imageset sequence thereof is now somewhat larger again. With this further expanded sequence, a smaller last palette 87A has been overwritten or otherwise grown (by appending more images, e.g.) so that the resulting last palette 89A is now substantially larger. Also as a part of the expansion, a duplicate of one or more such last palettes is likewise positioned at the beginning of the looped palette sequence as shown so that while scrolling a flicker resulting from a jump operation (from palette 89A to 89B, e.g.) can be minimized. By a comparison of FIGS. 10 and 11, it is apparent that a lead-in palette 87B that was previously present has been overwritten by a new lead-in palette 89B during the looped imageset sequence expansion.

Figure 12:
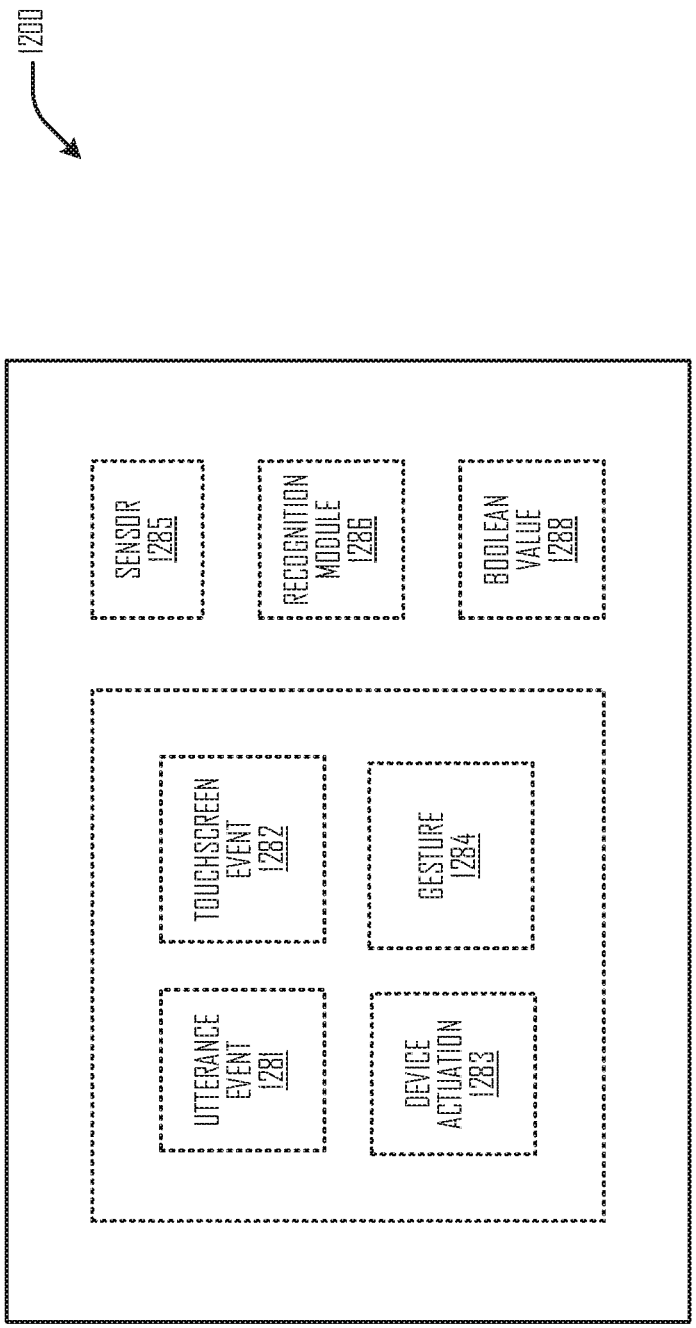
FIG. 12 depicts additional special-purpose transistor-based circuitry.

FIG. 12 illustrates special-purpose transistor-based circuitry 1200—optionally implemented as a component of an ASIC or client device 200, e.g.—in which some or all of the functional modules described herein may be implemented. Transistor-based circuitry 1200 includes one or more instances of data handling circuitry including an electrical node set upon which one or more event-indicative signals are represented digitally as a corresponding voltage configuration. As described herein such representations may include one or more device-detectable instances of utterance events 1281, of touchscreen events 1282, of device actuations 1283, or of other such device-detectable gestures 1284 captured by one or more sensors 1285 (cameras, touch detection elements, or microphones, e.g.) operably coupled to one or more instances of recognition modules 1286. Output from such a module 1286 may include one or more Boolean values 1288 manifesting a user action, apparent preference, selection, or other gesture-indicative signal as described herein. Such output may include an outcome of a comparison of a measurement (how long a user holds a key down or gazes at an image, e.g.) against a threshold, as well as one or more scalar measurements constituting the raw data upon which a Boolean determination described herein is based.

FIG. 13 depicts a data schematic 1300 in which one or more technologies may be implemented. As shown palette 1380 comprises a user-perceptible inventory of 27 images arranged in nine imagesets 1371A-1379A. Palette 1380 has a length 1381 several times greater than its width 1382 and contains several imagesets 1371A-1379A. Imageset 1371A includes a transversely-aligned set of several images 131A-C all having a length 1341 nominally in common (within 10%, e.g.). Imageset 1372A likewise includes a transversely-aligned set of images 132A-C all having a length nominally in common. Imageset 1373A likewise includes a transversely-aligned set of images 133A-C having a length nominally in common. Imageset 1374A likewise includes a transversely-aligned set of images 134A-C all having a length nominally in common. Imageset 1375A likewise includes a transversely-aligned set of images 135A-D all having a length nominally in common. Imageset 1376A likewise includes a transversely-aligned set of images 136A-C all having a length nominally in common. Imageset 1377A likewise includes a transversely-aligned set of images 137A-B both having a length nominally in common. Imageset 1378A likewise includes a transversely-aligned set of images 138A-C all having a length nominally in common. Imageset 1379A likewise includes a transversely-aligned set of images 139A-C all having a length nominally in common.

A user-viewable display region 1360 has a length 1361 and a width 1362 including a scrollbar 1367 as shown. A length of the button 1368 within scrollbar 1367 signifies a size of the region relative to the user-perceptible inventory. As scrolling progresses, region 1360 effectively moves in a downward direction incrementally relative to the mapped data space as shown so that a user perceives image movement in an upward direction 1355. (This is analogous to the rightward direction 655 of display region 660 through a mapped data space triggering a user-perceivable scrolling movement of images in a leftward direction 555 described above.)

FIG. 14 illustrates an interactive graphical display routine 1400 suitable for use with at least one embodiment, such as a client device 200 having special-purpose transistor-based circuitry 218. As will be recognized by those having ordinary skill in the art, not all events of image display are illustrated in FIG. 14. Rather, for clarity, only those steps reasonably relevant to describing the data handling and user interaction aspects of interactive graphical display routine 1400 are shown and described. Those having ordinary skill in the art will also recognize the present embodiment is merely one exemplary embodiment and that variations on the present embodiment may be made without departing from the scope of the broader inventive concepts set forth herein.

Following a start operation, execution block 1405 depicts configuring one or more palettes each to contain several imagesets and a palette scroll position (configuration module 422B causing an electrical node set 432B of a client device 200 to contain a voltage configuration 442B that manifests one or more instances of palette 1380, e.g.). This can occur, for example, in a context in which two or more images 131A-C in each imageset 131 may all share a length 1341 nominally in common by virtue of a subset of the images in an imageset 1371 having been magnified or reduced to match another of the images more closely. Following execution block 1405, execution then proceeds to opening loop block 1410.

Beginning in opening loop block 1410, interactive graphical display routine 1400 processes each palette scroll position in turn (control module 424A invoking execution blocks 1415, 1420, 1425, 1430 as shown for each scroll position, e.g.). Execution then proceeds to execution block 1415.

Execution block 1415 depicts presenting a looped palette sequence by autoscrolling through a succession of imagesets in each palette (configuration module 422A causing an electrical node set 432A of a client device 200 to contain a voltage configuration 442A that manifests a next scroll-position-indicative integer repeatedly as palette 1380 scrolls upward through display region 1360, e.g.) and loading a next palette (configuration module 422A loading a next instance of palette 1380 and displaying a next imageset 1371 of the next instance after displaying the last imageset 1379 of the current palette 1380, e.g.). Execution then proceeds to decision block 1420.

Decision block 1420 depicts determining whether or not one or more image selection gestures are detected (detection module 423A determining whether one or more device-detectable mouse click events, touchscreen activations, recitations of "what is that?" while gazing at an image, or other such device-detectable events manifesting a user selection of a particular imageset 1375 of interest to a user of client device 200, e.g.). This can occur, for example, in a context in which an electrical node set 433A of detection module 423A generates a voltage configuration 443A (a Boolean value 1288 of "yes" encoded as a logic "H," e.g.) to indicate a detected gesture (rather than a Boolean value 1288 of "no" encoded as a logic "L" to indicate no detected gesture); in which detection module 423A includes one or more sensors 1285 (microphones or cameras, e.g.) positioned to observe a vicinity of the user and operably coupled to a recognition module 1286; and in which the detected gesture comprises one or more utterance events 1281, touchscreen events 1282, or device actuations 1283. If no gesture is detected, execution block 1415 continues the autoscrolling. If a gesture is detected, execution proceeds to execution block 1430.

Execution block 1430 depicts updating the position (of display region 1360 relative to palette 1380, e.g.) based on the selected imageset. This can occur, for example, in a context in which update module 425B is configured to center the selected imageset 1375A (within display region 1360, e.g.) and in which the current palette identifier and palette scroll position do not change further during execution block 1425. Alternatively or additionally, a particular selected image 135B may be laterally centered (relative to direction 1355, e.g.) during execution block 1425. Execution then proceeds to execution block 1435.

Execution block 1435 depicts invoking a static presentation subroutine (performed by control module 424C, e.g.) such as that described below with reference to FIG. 18, which may provide an updated current palette identifier and palette scroll position. Execution then proceeds to execution block 1440.

In ending loop block 1440, interactive graphical display routine 1400 iterates back to opening loop block 1410 to process the next palette scroll position. Because the imageset sequence is looped, at some point such processing will include a jump operation to another copy of the current palette, optionally into a position several increments forward from the corresponding position. This can occur, for example, in a context in which the delay associated with loading the contents of the other copy is "T" times longer than that of stepping forward incrementally, in which the jump arrival position is about "T" times forward from the exactly corresponding arrival position, and in which a user-discernable scrolling abnormality (a flicker, e.g.) would otherwise occur during the jump operation. Once the user terminates the iterative scrolling display (by closing display region 1360, e.g.), interactive graphical display routine 1400 ends in ending block 1499.

Figure 16:
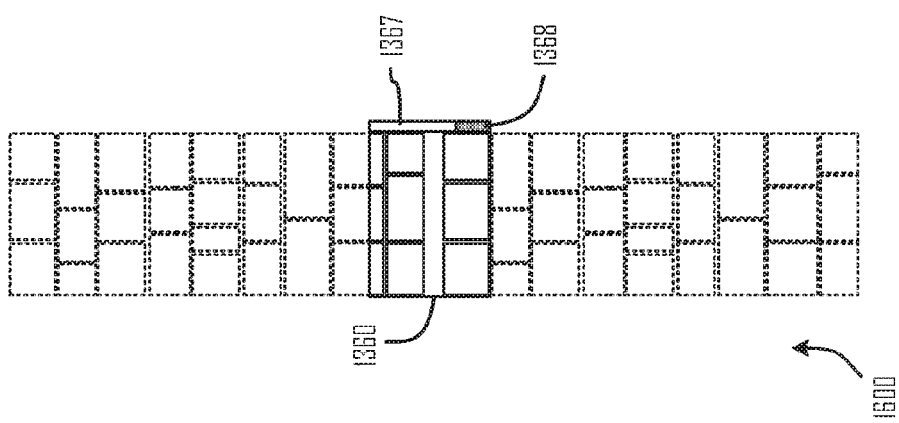
FIG. 16 depicts an eighth data schematic in relation to the seventh.
Figure 15:
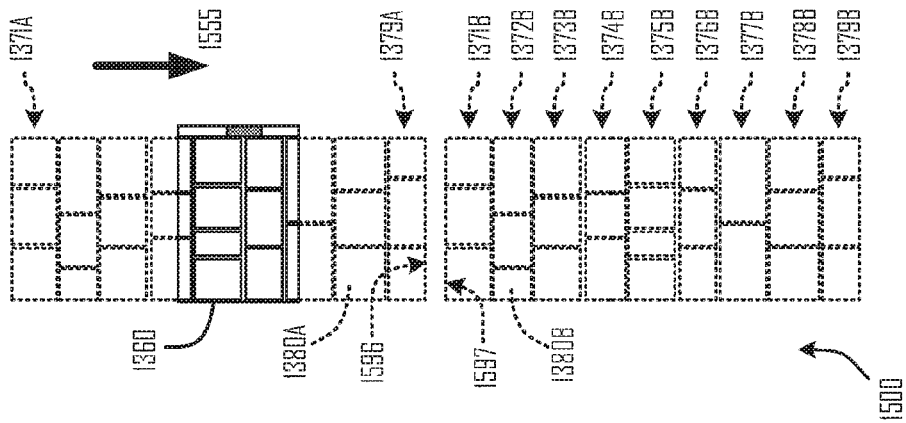
FIG. 15 depicts a seventh data schematic in relation to the sixth.

FIG. 15 depicts a variant data schematic 1500 somewhat modified from the data schematic 1300 of FIG. 13. The user-perceptible inventory of 27 images (in nine imagesets 1371A-1379A) comprise a first instance of palette 1380A just like palette 1380 of FIG. 13. A user-viewable display region 1360 effectively moves in a downward direction 1555 incrementally through the memory space as shown so that a user perceives image movement in an upward direction 1355 in FIG. 13. (This is analogous to the rightward direction 655 of display region 660 through memory space triggering a user-perceivable scrolling movement of images in a leftward direction 555 described above.) As such scrolling progresses the trailing edge 1596 of palette 1380A and the leading edge 1597 of a duplicate palette 1380B comes into view. The duplicate palette may include some or all of imagesets 1371B, 1372B, 1373B, 1374B, 1375B, 1376B, 1377B, 1378B, 1379B corresponding to those of imagesets 1371A, 1372A, 1373A, 1374A, 1375A, 1376A, 1377A, 1378A, 1379A FIG. 16 depicts a variant data schematic 1600 somewhat modified from the data schematic 1500 of FIG. 15. The user-perceptible imageset inventory of 27 images occurs twice, as in FIG. 15. In data schematic 1600, however, the display region 1360 has advanced downward several hundred pixels or more (relative to its earlier position shown in FIG. 15) to a position at which the trailing edge 1596 of a first palette 1380A and a leading edge 1597 of a next-successive palette 1380B are simultaneously visible within display region 1360. A current position of scroll button 1368 within scroll bar 1367 (i.e. at the bottom) signifies that display region 1360 is showing a corresponding portion of a current palette 1380A. A moment later scroll button 1368 will appear at a top of scroll bar 1367 signifying that display region 1360 is showing a corresponding portion (i.e. at the top) of a then-current palette 1380B.

Figure 17:
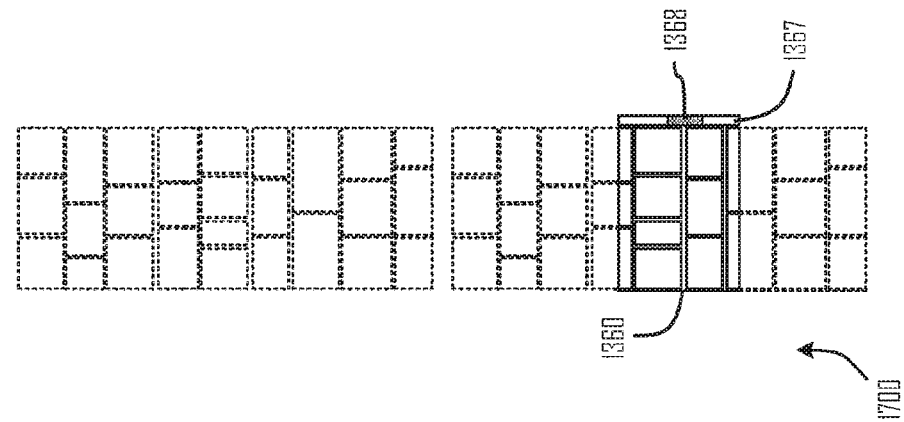
FIG. 17 depicts a ninth data schematic in relation to the eighth.

FIG. 17 depicts a variant data schematic 1700 somewhat modified from the data schematic 1600 of FIG. 16. The user-perceptible imageset inventory of 27 images occurs a plurality of times, as in FIGS. 15 and 16. In data schematic 1700, however, the display region 1360 has advanced downward several hundred pixels or more (relative to its earlier position shown in FIG. 16) to a position at which the leading edge 1597 of successive palette 1380B is no longer visible within display region 1360. A current position of scroll button 1368 within scroll bar 1367 (i.e. just below a middle position) signifies that display region 1360 is showing a corresponding portion of a current inventory (of 27 images arranged in 9 user-perceptible imagesets in palette 1380B, e.g.). This is analagoous to index 513 indicating an image number 10 or 11 (out of the 15 imagesets indicated in FIG. 5, e.g.) or to an analog-clocklike scroll position indicator pointing leftward (to a 7 o'clock or 10 o'clock position, e.g.). In some variants, moreover, such an indicator may include a peripheral arc-length or wedge angle (analogously to the size of scroll button 1368, e.g.) that depicts graphically what fraction of the inventory is currently presented in the display region 560, 660, 1360.

FIG. 18 illustrates a static presentation subroutine 1800 suitable for use with at least one embodiment, such as a client device 200 having special-purpose transistor-based circuitry 218. As will be recognized by those having ordinary skill in the art, not all events of information management are illustrated in FIG. 18. Rather, for clarity, only those steps reasonably relevant to describing the data handling and user interaction aspects of static presentation subroutine 1800 are shown and described. Those having ordinary skill in the art will also recognize the present embodiment is merely one exemplary embodiment and that variations on the present embodiment may be made without departing from the scope of the broader invention set forth herein.

Following a start operation, execution block 1805 depicts displaying a selected imageset in an interior of a first window (display module 421A programming an electrical node set 431A of a client device 200 to contain a voltage configuration 441A that manifests a longitudinal position of a display window 545, 1545, 1160 (along a scrolling direction or its opposite, e.g.) in which a single image 53E or other image set 1376 is at least roughly centered longitudinally in its respective display window, e.g.). This can occur, for example, in a context in which N is an integer that identifies a single selected image 136C uniquely and in which voltage configuration 441A is an integer (expressed in pixels, e.g.) that signifies the corresponding longitudinal position shared by other images 136B of the same imageset 1376. Alternatively or additionally, execution block 1805 may implement a transitional graphic effect by which a manifestation (a rectangle, e.g.) of the selected image moves toward the interior position (upon being selected, e.g.) over a user-perceptible time interval (of 0.1 to 1.0 second, e.g.). Execution then proceeds to execution block 1810.

Execution block 1810 depicts displaying at least some of one or more previous imagesets and at least some of one or more next imagesets adjacent imageset "N" (display module 421A presenting a portion of one or both adjacent imagesets 1375, 1377 simultaneously in a display region 1360 of a client device 200 with an imageset 1376 that includes a selected image 136C, e.g.). Execution then proceeds to decision block 1815.

Decision block 1815 depicts determining whether or not one or more imageset increment gestures are detected (detection module 423C determining whether one or more device-detectable mouse click events, touchscreen activations, recitations of "what is that?" while gazing at an image, or other such device-detectable gestures 1284 manifesting a user selection of a next imageset 1377 of greater interest to a user of client device 200 than an imageset 1376 that includes a selected image 136C, e.g.). This can occur, for example, in a context in which an electrical node set 433C of detection module 423C has two nodes and manifests a voltage configuration 443C of two high voltages (encoded as "HH," e.g.) to signify an affirmative detection or any other value (encoded as "LL" or "LH" or "HL," e.g.) to signify a negative determination. If an incrementing gesture is detected (by a user having clicked on step-forward button 502, e.g.), execution proceeds to execution block 1820. If a decrementing gesture is detected (encoded as "LL" in response to a user having clicked on step-backward button 501, e.g.) by detection module 423C at decision block 1825, execution proceeds to execution block 1830. Otherwise execution proceeds to decision block 1835.

Execution block 1820 depicts incrementing an integer that identifies a current imageset (update module 425B incrementing an index to select a next image 53F, e.g.). This can occur, for example, in a context in which the currently selected imageset is image 53E. Execution then proceeds back to execution block 1805. Alternatively or additionally, the index may be manifested as a voltage configuration 445B on electrical node set 435B.

Execution block 1830 depicts decrementing an integer that identifies a current imageset (update module 425A decrementing index 513 to select a previous image 53D, e.g.). This can occur, for example, in a context in which index 513 includes a binary integer manifested as a voltage configuration 445A on node set 435A (like a value of "101" on a set of several nodes, e.g.). Execution then proceeds back to execution block 1805.

Decision block 1835 depicts determining whether or not one or more image query gestures are detected (detection module 423D determining whether one or more device-detectable mouse click events, touchscreen activations, or other such device-detectable gestures 1284 manifesting a desire for more information about a now-selected image, e.g.). This can occur, for example, in a context in which an electrical node set 433D of detection module 423D manifests a voltage configuration 443D of either a low voltage to signify an affirmative detection or a high value to signify a negative determination. If the determination by detection module 423D is in the affirmative at decision block 1835, execution proceeds to execution block 1840.

Execution block 1840 depicts presenting secondary information about the current imageset (display module 421B presenting more detailed metadata 508 specifically associated with the current imageset, e.g.). This can occur, for example, in a context in which the "current imageset" is a single image 53E or a row or column of related images that scroll together. Alternatively or additionally, the "secondary information" may include popping up a new instance of display window 545 with newly-constructed palettes assembled from images that have most or all tags 512 matching the current imageset. Once the presentation of the secondary information is complete (when the new display window is closed or the secondary information is otherwise dismissed by a user, e.g.), execution then proceeds back to decision block 1845.

Decision block 1845 depicts determining whether or not one or more autoscroll resume gestures are detected (detection module 423B determining whether one or more device-detectable mouse click events toggling a pause/play button 503 back to "play" mode 291 or other such device-detectable gestures 1284 manifesting a desire to resume autoscrolling through images, e.g.). This can occur, for example, in a context in which an electrical node set 433B of detection module 423B has a voltage configuration 443B of either a higher voltage to signify an affirmative detection or a lower value to signify a negative determination. If the determination by detection module 423B is in the negative at decision block 1845, execution proceeds back to execution block 1805. Otherwise execution then proceeds to execution block 1899.

Ending block 1899 depicts ending the static presentation subroutine (control module 424D configuring an electrical node set 434D with a voltage configuration 444D signifying a memory address of a particular longitudinal position within a looped imageset sequence 598, e.g.). This can occur, for example, in a context in which the memory address signifies a particular palette and a scroll position within that palette and in which the memory address signifies a location corresponding to a current display region 560, 660, 1360 described above. Static presentation subroutine 1800 ends in ending block 1899.

Figure 19:
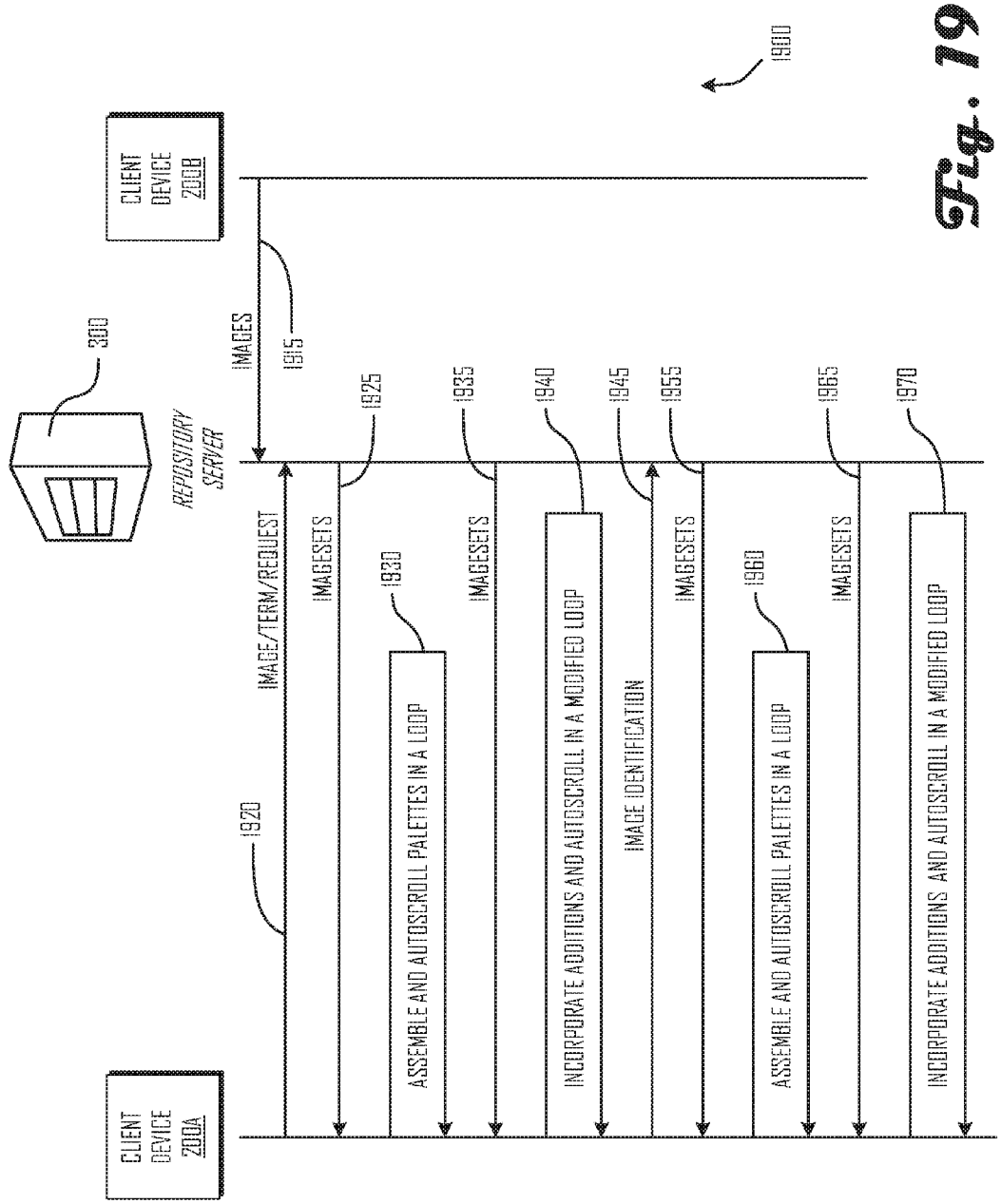
FIG. 19 depicts a data flow diagram suitable for use with at least one embodiment.

FIG. 19 illustrates a data flow diagram 1900 depicting a sequence of events that may occur in light of the foregoing technology. As will be recognized by those having ordinary skill in the art, not all events of information management are illustrated in FIG. 19, as previously explained. The first event depicted signifies an aggregation of images 1915 arriving at repository server 300 from many instances of client device 200B like the one shown. A search image, search term, subscription, or actionable content request 1920 that subsequently arrives may then trigger a transaction (a search or other process, e.g.) or similar trigger upon which many initial imagesets 1925 (photos or animations, e.g.) are arranged (into palettes, image search results, or other such data groupings, e.g.) and sent. Such initial content is then assembled (in memory 204, e.g.) into an initial plurality of palettes (such as data configurations 800) and autoscrolled in a loop 1930 (as depicted in graphical display routine 1400, e.g). As additional imagesets 1935 are later provided by repository server 300 (selected by the same criteria, e.g.), they are placed in additional palettes 87A in a modified looped imageset sequence (facilitating minimal-flicker jumping by each being in a data configuration 1000 having one or more leading-end palettes 87B that are each a duplicate of a trailing-end counterpart, e.g.) and iteratively autoscrolled 1940 as described above.

In response to a later image identification 1945 from client device 200A manifesting a field of particular interest (identifying a particular image 53E with an image query gesture, e.g.) sufficient to warrant creating a new display window 545 or the like (as an anticipatory search, e.g.), a response may include new imagesets 1955 provided to client device 200B. Such new content is then likewise assembled into an independent plurality of palettes autoscrolled 1960 (as depicted in graphical display routine 1400, e.g). As additional imagesets 1965 are later provided to client device 200A (selected by the same criteria, e.g.), they are likewise placed in a modified looped imageset sequence (facilitating minimal-flicker jumping by each being in a data configuration 1100 having one or more leading-end palettes 89B that are each substantially a duplicate of a trailing-end counterpart, e.g.) and iteratively autoscrolled 1970 as described above.

In one exemplary scenario as described above, an interactive graphical display method includes configuring an electrical node set of a client device 200 to contain a voltage configuration that manifests first and second mixed-shape palettes, the first and second mixed-shape palettes each having various aspect ratios. The first mixed-shape palette is scrolled through (as an automatic response to an application program initiation at the client device, e.g.) until first user input at the user interface manifests a user selection of first digital image of the many digital images of the first mixed-shape palette. As a response to the first user input effectively selecting the first digital image (a click, touch, or hover-over event at the image, e.g.) the first digital image is moved to an inner region of a first window of the user interface. Also the scrolling through the first mixed-shape palette is paused.

The user may then deselect the first digital image, in response to which scrolling is resumed. See FIG. 18. A trailing edge of the first mixed-shape palette and a leading edge of the second mixed-shape palette are subsequently presented simultaneously at the user interface. A series of mixed-shape palettes that includes at least the second mixed-shape palette is then scrolled through repeatedly at the user interface until a user selection of a portion of the second mixed-shape palette, wherein the portion of the second mixed-shape palette comprises a second digital image. In response to this, the second digital image is moved to the inner region of the first window of the user interface.

In responding to a subsequent user action at the user interface after the second digital image moves to the inner region of the first window, a third digital image akin to the second digital image is presented (having one or more alphanumeric content descriptors, location identifiers, or other metadata attributes in common but not being derived from the same photograph, e.g.).

In light of teachings herein, numerous existing techniques may be applied for configuring special-purpose circuitry or other structures effective for implementing an event recognition module or suitable animation without undue experimentation or for configuring other decisions and devices as described herein. See, e.g., U.S. Pat. No. 9,417,779 ("Scrollable area multi-scale viewing"); U.S. Pat. No. 9,400,598 ("Fast and smooth scrolling of user interfaces operating on thin clients"); U.S. Pat. No. 9,395,811 ("Automatic text scrolling on a display device"); U.S. Pat. No. 9,354,803 ("Scrolling list with floating adjacent index symbols"); U.S. Pat. No. 9,311,718 ("Automated content scrolling"); U.S. Pat. No. 9,037,995 ("Application programming interfaces for scrolling operations"); U.S. Pat. No. 9,021,386 ("Enhanced user interface scrolling system"); U.S. Pat. No. 9,009,626 ("Method and apparatus for accelerated scrolling"); U.S. Pat. No. 9,009,620 ("Interactive scrollbars for unknown data size"); U.S. Pat. No. 8,949,735 ("Determining scroll direction intent"); U.S. Pat. No. 8,910,073 ("Enhancing visual continuity in scrolling operations"); U.S. Pat. No. 8,767,014 ("Automatic text scrolling on a display device"); U.S. Pat. No. 8,737,821 ("Automatic triggering of a zoomed-in scroll bar for a media program based on user input"); U.S. Pat. No. 8,661,363 ("Application programming interfaces for scrolling operations"); U.S. Pat. No. 8,601,389 ("Scrollable menus and toolbars"); U.S. Pat. No. 8,595,645 ("Device, method, and graphical user interface for marquee scrolling within a display area"); U.S. Pat. No. 8,429,557 ("Application programming interfaces for scrolling operations"); U.S. Pat. No. 8,429,521 ("Scrolling in large hosted data set"); and U.S. Pat. No. 8,396,921 ("Cached and server views with automatic caching and smooth scrolling"). All of the patents and other publications referred to above are incorporated herein by reference in their entirety—including those identified in relation to particular new applications of existing techniques—to the extent not inconsistent herewith.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses 1. (Independent) An interactive graphical display system 100 comprising:
   transistor-based circuitry (configuration module 422B, e.g.) configured to cause one or more palettes 83-86, 1380 in a looped imageset sequence each to contain several imagesets 1371-1379, 1955;
   transistor-based circuitry (control module 424A and configuration module 422A operating jointly, e.g.) that incrementally autoscrolls forward in the looped imageset sequence in an autoscroll mode 291;
   transistor-based circuitry (detection module 423A and configuration module 422A operating jointly, e.g.) configured to cause an incremental autoscroll forward again in the looped imageset sequence as a conditional response to a determination 292 that no selection gesture was detected (pursuant to an invocation of detection module 423A, e.g.); and
   transistor-based circuitry (control module 424C and display hardware 212 operating jointly, e.g.) configured to toggle between the autoscroll mode 291 and a static viewing mode (a stepping mode 291 like that of FIG. 18, e.g.) as a conditional response to an imageset selection gesture (that identifies a particular image 53-54, 131-138 or other imageset 1371-1379 corresponding to a time or location (or both) of an utterance event 1281, touchscreen event 1282, device actuation 1283, or other device-detectable imageset selection gesture 1284 recognized as such by detection module 423A).

2. The system of any of the SYSTEM CLAUSES above, wherein the transistor-based circuitry all resides in a single portable device.

3. The system of any of the SYSTEM CLAUSES above, wherein the transistor-based circuitry all resides in a single portable device and wherein the transistor-based circuitry configured to toggle between the autoscroll mode and the static viewing mode comprises:
   a control module configured to recognize a toggle-indicative utterance event 1281 (a vocalization like "go back," e.g.) as a command to reverse autoscroll direction (from forward to backward or vice versa, e.g.).

4. The system of any of the SYSTEM CLAUSES above, wherein the transistor-based circuitry all resides in a single wearable device and wherein the transistor-based circuitry configured to toggle between the autoscroll mode and the static viewing mode comprises:
   a control module configured to recognize a mode-indicative utterance event 1281 (a vocalization like "step forward" or "go back two," e.g.) as a command to transition (between imagesets) in a stepping mode 291 (i.e. as an instance of the static viewing mode).

5. The system of any of the SYSTEM CLAUSES above, wherein the transistor-based circuitry all resides in a single common Application Specific Integrated Circuit (ASIC).

6. The system of any of the SYSTEM CLAUSES above, configured to perform one of the methods described below.

7. (Independent) An interactive graphical display method (see FIG. 14, e.g.) comprising:
   invoking transistor-based circuitry (configuration module 422B, e.g.) that causes one or more palettes 83-86, 1380 each to contain several imagesets 1371-1379, 1955 in a looped imageset sequence (sequence 598, e.g.);

invoking transistor-based circuitry (control module 424A and configuration module 422A operating jointly, e.g.) configured to implement an autoscroll mode 291 by incrementally autoscrolling forward in the looped imageset sequence;

invoking transistor-based circuitry (detection module 423A and configuration module 422A operating jointly, e.g.) configured to autoscroll forward incrementally again in the looped imageset sequence as a conditional response to a determination 292 that no selection gesture was detected; and presenting an indication of toggling between the autoscroll mode 291 and a static viewing mode (control module 424C manifesting a stationary palette scroll position or autoscroll animation, e.g.) as a conditional response to a selection gesture that identifies a selected imageset (a particular image 53-54, 131-138 or other imageset 1371-1379 corresponding to a time or location (or both) of an utterance event 1281, touchscreen event 1282, device actuation 1283, or other device-detectable gesture 1284 recognized as such by detection module 423A).

8. The method of any of the METHOD CLAUSES above, comprising:

obtaining all images 1915 for use in the several imagesets 1371-1379, 1955 in the looped imageset sequence in a single image search result from a search engine based upon a search term entered into a search field 505.

9. The method of any of the METHOD CLAUSES above, comprising:

switching from the autoscroll mode to the static viewing mode as a conditional response to a touchscreen event 1282.

10. The method of any of the METHOD CLAUSES above, comprising:

configuring a user-viewable display region 1360 having a length 1361, a width 1362, and a scrollbar 1367 along its length 1361, wherein a length of a button 1368 within the scrollbar 1367 (proportionally) signifies a size of the user-viewable display region 560, 660, 1360 relative to a user-perceptible inventory in the looped imageset sequence (of distinct images therein, e.g.).

11. The method of any of the METHOD CLAUSES above, comprising:

configuring a user-viewable display region 1360 having a length 1361, a width 1362, and a scrollbar 1367 along its length 1361, wherein a length of a button 1368 within the scrollbar 1367 (proportionally) signifies a size of the user-viewable display region 560, 660, 1360 relative to a user-perceptible inventory in the looped imageset sequence, wherein the looped imageset sequence is larger than the user-perceptible inventory (at least) by virtue of some image duplication.

12. The method of any of the METHOD CLAUSES above, comprising:

implementing the autoscroll mode so that a user-viewable display region 560, 660 effectively moves (rightward) incrementally relative to a mapped data space that contains the looped imageset sequence so that apparent image movement (seemingly) progresses in a leftward direction 555.

13. The method of any of the METHOD CLAUSES above, comprising:

configuring the first palette 1380 with a length 1381 more than twice its width 1382 and to contain several imagesets 1371A-1379A at least one imageset 1371A of which includes a transversely-aligned set of several images 131A-C (i.e. three or more) all having a length 1341 in common within 10%.

14. The method of any of the METHOD CLAUSES above, comprising:

minimizing flicker in the autoscroll mode by jumping in a first direction between opposite-end counterparts of the looped imageset sequence;

after reversing autoscroll direction as a conditional response to a user action, minimizing flicker again by jumping in a second direction opposite the first direction between the opposite-end counterparts of the looped imageset sequence.

15. The method of any of the METHOD CLAUSES above, comprising:

invoking transistor-based circuitry (display module 421A, e.g.) configured to present a first stationary imageset 1371-1379, 1955 (i.e. not autoscrolling) in a first palette 83-86, 1380 simultaneously with the two or more other imagesets 1371-1379, 1955 in the first palette in an interior (a center, e.g.) of a first window 545.

16. The method of any of the METHOD CLAUSES above, comprising:

invoking transistor-based circuitry (detection module 423D, e.g.) configured to detect user action (a manifested preference detected via a menu selection or other user input 208 or other event recognition, e.g.) that includes one or more first image query gestures 1284 (an utterance event 1281, touchscreen event 1282, or other device actuation 1283, e.g.) and that fully articulates a user preference for (viewing image provenance, commentary, or other details about) a first image 53-54, 131-139 over the two or more other imagesets 1371-1379, 1955 (specifically pointing to the first image or expressing its unique serial number, e.g.) in the first palette 83-86, 1380;

invoking transistor-based circuitry (display module 421B, e.g.) configured to present metadata relating to the first image 53-54, 131-139 (identifying origin, age, size, resolution, content-indicative keywords, or some combination of these, e.g.) of the first stationary imageset 1371-1379, 1955 in response to the user action that includes the one or more first image query gestures 1284 and that fully articulates the user preference for the first image 53-54, 131-139 (at least) over the two or more other imagesets 1371-1379, 1955 in the first palette 83-86, 1380.

17. The method of any of the METHOD CLAUSES above, comprising:

aggregating images 1915 arriving at a server 300 from many autonomous client devices (i.e. a dozen or more), the images including the first image, the first image containing an animation;

forming the imagesets 1371-1379, 1955 by grouping some or all of the images and the palette(s) by grouping some or all of the imagesets;

after autoscrolling through the looped imageset sequence, placing later-arriving additional imagesets 1935 into one or more additional palettes 87A in a modified looped imageset sequence; and autoscrolling through the modified looped imageset sequence.

18. The method of any of the METHOD CLAUSES above, comprising:

minimizing flicker in the autoscroll mode by jumping (in either direction) between a leading-end palette 87B and a duplicate, trailing-end counterpart of the leading-end palette 87B.

19. The method of any of the METHOD CLAUSES above, comprising:

appending one or more imagesets onto a first end of a looped imageset sequence, one imageset thereby becoming an endmost palette at a first end of a modified version of the looped imageset sequence, wherein (at least) the endmost palette at the first end of the modified version of the looped imageset sequence is also duplicated as an opposite-end counterpart at (i.e. on or near) a second end of the modified version of the looped imageset sequence; and jumping (in either direction) between the opposite-end counterpart (palette 87B, e.g.) and the endmost palette (palette 87A, e.g.) at the first end of the modified version of the looped imageset sequence.

20. The method of any of the METHOD CLAUSES above, comprising:

appending one or more imagesets onto a first end of a looped imageset sequence, one imageset thereby becoming an endmost palette at a first end of a modified version of the looped imageset sequence, wherein (at least) the endmost palette (palette 89A, e.g.) at the first end of the modified version of the looped imageset sequence is also duplicated by replacing another palette (palette 87B, e.g.) and thereby becoming an opposite-end counterpart (palette 89B, e.g.) at a second end of the modified version of the looped imageset sequence; and minimizing flicker in the autoscroll mode by jumping (in either direction) between the opposite-end counterpart and the endmost palette at the first end of the modified version of the looped imageset sequence.

21. The method of any of the METHOD CLAUSES above, comprising:

appending one or more imagesets onto a first end of a looped imageset sequence, one imageset thereby becoming an endmost palette at a first end of a modified version of the looped imageset sequence, wherein (at least) the endmost palette (palette 89A, e.g.) at the first end of the modified version of the looped imageset sequence is also duplicated by replacing another palette (palette 87B, e.g.) and thereby becoming an opposite-end counterpart (palette 89B, e.g.) at a second end of the modified version of the looped imageset sequence; and jumping from the opposite-end counterpart to the endmost palette at the first end of the modified version of the looped imageset sequence.

22. The method of any of the METHOD CLAUSES above, comprising:

invoking transistor-based circuitry (one or more detection modules 423A-C, e.g.) configured to detect user action that includes (two or more) user-provided step gestures 1284 followed by an autoscroll gesture 1284 all being part of a series 293; and invoking transistor-based circuitry (display module 421A and one or more update modules 425A-B operating jointly, e.g.) configured to present first and second stationary imagesets 1371-1379, 1955 in respective palettes 83-86, 1380 simultaneously in an interior of a first window 545 (within an outermost portion thereof, e.g.) after moving from the first stationary imageset to the second stationary imageset in response to the series 293 of user-provided step gestures until an autoscroll gesture is detected, whereupon one or more next imagesets 1371-1379, 1955 are presented in an autoscroll mode 291 originating from a (palette identifier and) palette scroll position (as depicted in execution block 1899, e.g.) that correspond to the second stationary imageset 1371-1379, 1955 (identifying a longitudinal pixel position of the second stationary imageset within the interior of the first window prior to the autoscroll mode 291, e.g.).

23. The method of any of the METHOD CLAUSES above, comprising:

invoking transistor-based circuitry (display module 421A, e.g.) configured to present a first stationary imageset 1371-1379, 1955 (i.e. not autoscrolling) in a first palette 83-86, 1380 simultaneously with two or more other imagesets 1371-1379, 1955 in the first palette in an interior (a center, e.g.) of a first window 545;

invoking transistor-based circuitry (detection module 423D, e.g.) configured to detect user action (a manifested preference detected via a menu selection or other user input 208 or other event recognition, e.g.) that includes one or more first image query gestures 1284 (an utterance event 1281, touchscreen event 1282, or other device actuation 1283, e.g.) and that fully articulates a user preference for (viewing details about) a first image 53-54, 131-139 over the two or more other imagesets 1371-1379, 1955 in the first palette 83-86, 1380;

invoking transistor-based circuitry (display module 421B, e.g.) configured to present metadata 508 relating to the first image 53-54, 131-139 (including tags 512 or the like identifying origin, age, size, resolution, content-indicative keywords, or some combination of these, e.g.) of the first stationary imageset 1371-1379, 1955 in response to the user action that includes the one or more first image query gestures 1284 and that fully articulates the user preference for (viewing details about) the first image 53-54, 131-139 over (any presented image in) the two or more other imagesets 1371-1379, 1955 in the first palette 83-86, 1380;

invoking transistor-based circuitry (one or more detection modules 423A-C, e.g.) configured to detect user action that includes a user action series 293 of user-provided step gestures 1284 followed by an autoscroll gesture 1284; and invoking transistor-based circuitry (display module 421A and one or more update modules 425A-B operating jointly, e.g.) configured to present a second stationary imageset 1371-1379, 1955 in a second palette 83-86, 1380 simultaneously with two or more other imagesets 1371-1379, 1955 in the second palette 83-86, 1380 in the interior of the first window 545 after moving from the first palette 83-86, 1380 to the second palette 83-86, 1380 in response to the user-provided step gestures until the autoscroll gesture is detected, whereupon one or more next imagesets 1371-1379, 1955 are presented in an autoscroll mode 291 originating from a (current palette identifier and) palette scroll position (as depicted in execution block 1899, e.g.) that corresponds to the second stationary imageset 1371-1379, 1955.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting.

What is claimed is:

1. An interactive graphical display method comprising:
invoking transistor-based circuitry configured to present a first stationary imageset in a first palette simultaneously with two or more other imagesets in said first palette in an interior of a first window;
invoking transistor-based circuitry configured to detect user action that includes one or more first image query gestures and that fully articulates a user preference for a first image over said two or more other imagesets in said first palette;
invoking transistor-based circuitry configured to present metadata relating to said first image of said first stationary imageset in response to said user action that includes said one or more first image query gestures and that fully articulates said user preference for said first image over said two or more other imagesets in said first palette;
invoking transistor-based circuitry configured to detect user action that includes a series of user-provided step gestures followed by an autoscroll gesture of said user action;
invoking transistor-based circuitry configured to present a second stationary imageset in a second palette simultaneously with two or more other imagesets in said second palette in said interior of said first window after moving from said first palette to said second palette in response to said series of user-provided step gestures until said autoscroll gesture is detected, whereupon one or more next imagesets are presented in an autoscroll mode originating from a palette scroll position that corresponds to said second stationary imageset;
invoking transistor-based circuitry configured to cause several palettes in a looped imageset sequence each to contain several imagesets, wherein said several palettes include said first and second palettes and wherein all of said images used in said several imagesets in said looped imageset sequence were obtained in a single image search result from a search engine based upon a search term entered into a search field;
invoking transistor-based circuitry configured to implement said autoscroll mode by incrementally autoscrolling forward in said looped imageset sequence;
invoking transistor-based circuitry configured to autoscroll forward incrementally again in said looped imageset sequence as a conditional response to a determination that no selection gesture was detected; and
presenting via a display screen of a mobile device an indication of toggling between said autoscroll mode and a static viewing mode as a conditional response to an imageset selection gesture at said mobile device.

2. The method of claim 1, comprising:
configuring said first palette with a length more than twice its width and to contain several imagesets at least one imageset of which includes a transversely-aligned set of several images all having a length in common within 10%.

3. The method of claim 1, comprising:
jumping between a leading-end third palette and a duplicate, trailing-end fourth palette that is a duplicate counterpart of said leading-end third palette.

4. The method of claim 1, comprising:
appending one or more imagesets onto a first end of said looped imageset sequence, one imageset thereby becoming an endmost third palette at a first end of a modified version of said looped imageset sequence, wherein said endmost third palette at said first end of said modified version of said looped imageset sequence is also duplicated as an opposite-end counterpart fourth palette at a second end of said modified version of said looped imageset sequence; and
minimizing flicker in said autoscroll mode by jumping between said opposite-end counterpart fourth palette and said endmost third palette at said first end of said modified version of said looped imageset sequence.

5. An interactive graphical display method comprising:
invoking transistor-based circuitry configured to cause one or more palettes in a looped imageset sequence each to contain several imagesets;
invoking transistor-based circuitry configured to implement an autoscroll mode by incrementally autoscrolling forward in said looped imageset sequence, wherein all images in said several imagesets in said looped imageset sequence have been obtained in a single image search result from a search engine based upon a search term entered into a search field;
invoking transistor-based circuitry configured to autoscroll forward incrementally again in said looped imageset sequence as a conditional response to a determination that no selection gesture was detected; and
presenting via a display screen an indication of toggling between said autoscroll mode and a static viewing mode as a conditional response to an imageset selection gesture.

6. The method of claim 5, comprising:
configuring a user-viewable display region on said display screen and having a length, a width, and a scrollbar along its length, wherein a length of a button within said scrollbar signifies a size of said user-viewable display region relative to a user-perceptible inventory in said looped imageset sequence, wherein said looped imageset sequence is larger than said user-perceptible inventory by virtue of image duplication.

7. The method of claim 5, comprising:
implementing said autoscroll mode so that a user-viewable display region effectively moves incrementally relative to a mapped data space that contains said looped imageset sequence so that apparent image movement progresses in a leftward direction.

8. The method of claim 5, comprising:
minimizing flicker in said autoscroll mode by jumping in a first direction between opposite-end counterparts of said looped imageset sequence;
after reversing autoscroll direction as a conditional response to a user action, minimizing flicker again by jumping in a second direction opposite said first direction between said opposite-end counterparts of said looped imageset sequence.

9. The method of claim 5, comprising:
invoking transistor-based circuitry configured to present a first stationary imageset in a first palette of said one or more palettes simultaneously with said two or more other imagesets in said first palette in an interior of a first window.

10. The method of claim 5, comprising:
invoking transistor-based circuitry configured to detect user action that includes one or more first image query gestures and that fully articulates a user preference for a first image over said two or more other imagesets in a first palette of said one or more palettes;

invoking transistor-based circuitry configured to present metadata relating to said first image of said first stationary imageset in response to said user action that includes said one or more first image query gestures and that fully articulates said user preference for said first image over said two or more other imagesets.

11. The method of claim 5, comprising:

aggregating images arriving at a server from many autonomous client devices, said images including a first image containing an animation;

forming said imagesets by grouping some or all of said images and said one or more palettes by grouping some or all of said imagesets;

after autoscrolling through said looped imageset sequence, placing later-arriving additional imagesets into one or more additional palettes in a modified looped imageset sequence; and autoscrolling through said modified looped imageset sequence.

12. The method of claim 5, comprising:

minimizing flicker in said autoscroll mode by jumping between a leading-end palette of said one or more palettes and a duplicate, trailing-end counterpart of said leading-end palette.

13. The method of claim 5, comprising:

appending one or more imagesets onto a first end of said looped imageset sequence, one imageset thereby becoming an endmost palette of said one or more palettes at a first end of a modified version of said looped imageset sequence, wherein said endmost palette at said first end of said modified version of said looped imageset sequence is also duplicated by replacing another palette and thereby becoming an opposite-end counterpart at a second end of said modified version of said looped imageset sequence; and jumping between said opposite-end counterpart and said endmost palette at said first end of said modified version of said looped imageset sequence.

14. The method of claim 5, comprising:

invoking transistor-based circuitry configured to detect user action that includes one or more first image query gestures and that fully articulates a user preference for a first image over said two or more other imagesets in a first palette of said one or more palettes; and invoking transistor-based circuitry configured to present metadata relating to said first image of said first stationary imageset in response to said user action that includes said one or more first image query gestures and that fully articulates said user preference for said first image over said two or more other imagesets in said first palette.

15. The method of claim 5, comprising:

invoking transistor-based circuitry configured to detect user action that includes user-provided step gestures followed by an autoscroll gesture all being part of a user action series; and invoking transistor-based circuitry configured to present first and second stationary imagesets in respective palettes of said one or more palettes simultaneously in an interior of a first window after moving from said first stationary imageset to said second stationary imageset in response to said user-provided step gestures until said autoscroll gesture is detected, whereupon one or more next imagesets are presented in an autoscroll mode originating from a palette scroll position that correspond to said second stationary imageset.

16. An interactive graphical display system comprising:

transistor-based circuitry configured to cause one or more palettes each to contain several imagesets in a looped imageset sequence;

transistor-based circuitry configured to implement an autoscroll mode by incrementally autoscrolling forward in said looped imageset sequence, wherein all images in said several imagesets in said looped imageset sequence have been obtained in a single image search result from a search engine based upon a search term entered into a search field;

transistor-based circuitry configured to autoscroll forward incrementally again in said looped imageset sequence as a conditional response to a determination that no selection gesture was detected; and a display screen configured to present an indication of toggling between said autoscroll mode and a static viewing mode as a conditional response to a selection gesture that identifies a selected imageset.

\* \* \* \* \*